United States Patent [19]

Berthiller

[11] Patent Number: 4,592,290

[45] Date of Patent: Jun. 3, 1986

[54] METHOD OF INCINERATING STALKS, ESPECIALLY OF STRAW

[76] Inventor: Franz Berthiller, A-3474, Winkl, 22, Austria

[21] Appl. No.: 738,191

[22] Filed: May 24, 1985

Related U.S. Application Data

[60] Continuation-in-part of Ser. No. 345,382, Feb. 3, 1982, abandoned, which is a division of Ser. No. 163,399, Jun. 26, 1980, Pat. No. 4,314,513.

[30] Foreign Application Priority Data

Jun. 28, 1979 [AT] Austria .................................. 4535/79

[51] Int. Cl.$^4$ .......................... F23B 79/00; F23G 5/04
[52] U.S. Cl. .................................... 110/346; 110/224; 110/225; 110/228; 110/106
[58] Field of Search ................ 110/196, 218, 222–225, 110/228, 244, 341, 346, 106

[56] References Cited

U.S. PATENT DOCUMENTS

| | | | |
|---|---|---|---|
| 2,102,427 | 12/1937 | Lloyd et al. | 110/224 |
| 2,147,152 | 2/1939 | Connolly | 110/225 |
| 2,171,535 | 9/1935 | Berg et al. | 110/225 |
| 4,046,085 | 9/1977 | Barry et al. | 110/225 |
| 4,121,524 | 10/1978 | Voelskow et al. | 110/224 |
| 4,182,246 | 1/1980 | Lombana et al. | 110/225 |
| 4,186,668 | 2/1980 | Tabel | 110/224 |
| 4,253,405 | 3/1981 | Cottrell et al. | 110/244 |

Primary Examiner—Henry C. Yuen
Attorney, Agent, or Firm—Karl F. Ross; Herbert Dubno

[57] ABSTRACT

Stalks of crop material, especially straw, are incinerated by comminuting them to pieces having a length of substantially 8 to 10 cm, pneumatically transporting the stalks to a separator in which the air is separated from the stalks and the stalks are then compacted and advanced in a rising bed into a furnace. Within the furnace, a low temperature distillation is initially effected and combustion is promoted along the free surface of the bed, in part sustained by the gases produced by the distillation. Ash as it is formed on the surface is entrained away with the hot gases. The ash is separated from the hot gases and advantageously collected in a water basin while the hot gases can be used for agricultural drying purposes and the ash for fertilizer.

7 Claims, 5 Drawing Figures

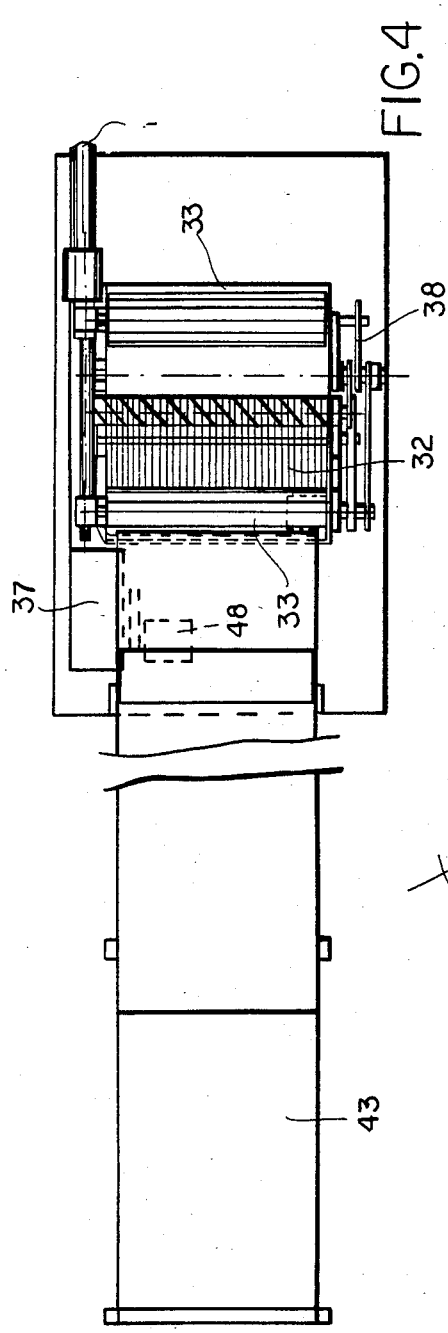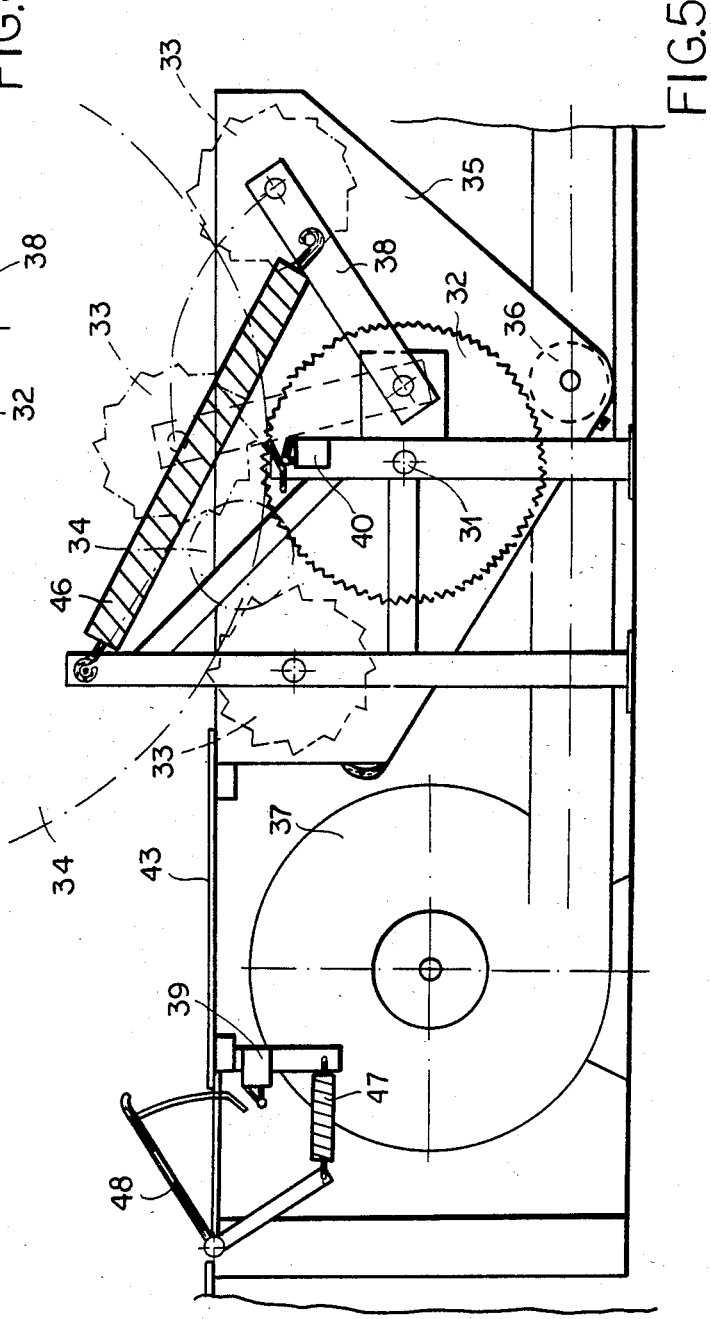

METHOD OF INCINERATING STALKS, ESPECIALLY OF STRAW

CROSS REFERENCE TO RELATED APPLICATION

This application is a continuation-in-part of Ser. No. 345,382 filed Feb. 3, 1982, now abandoned, which is a division of Ser. No. 163,399 filed June 26, 1980, now U.S. Pat. No. 4,314,513 issued Feb. 9, 1982.

FIELD OF THE INVENTION

My present invention relates to a method of incinerating stalks and, more particularly, for the destruction by burning of straw stalks which generally are relatively long.

BACKGROUND OF THE INVENTION

Following the harvesting of grain, straw in the form of stalks is a common byproduct and frequently must be disposed of.

In German patent document (Open application—Offenlegungsschrift) DE-OS No. 2,721,213, for example, there is described a process for the burning of straw in which bales of straw are fed one after the other into a combustion chamber and burn with an open flame therein.

This process is substantially discontinuous because the burning of one bale must await the practically complete burning of the previous bale, so that, although the bales are fed in succession, a subsequent bale cannot be advanced until the previous bale has burned down at least to a point that the major part of its mass has been destroyed and only a small glowing pile remains to ignite the next bale.

Since the practically complete combustion of a bale is time-consuming, this method, and the apparatus for carrying it out, do not operate continuously and involve time-consuming operations which must be monitored with care and efficiency.

OBJECT OF THE INVENTION

It is the principal object of my present invention to provide an improved method of burning straw and similar stalk crops whereby disadvantages of earlier systems can be obviated and the stalk crop burned substantially continuously.

SUMMARY OF THE INVENTION

This object and others according to the present invention which will become apparent hereinafter, are attained by a process whereby the stalk crop is initially cut, chopped or otherwise subdivided (comminuted) into pieces of a length of 8 to 10 cm. and the pieces are pneumatically advanced to the combustion chamber in an air stream.

At the combustion chamber, the conveying air is separated from the pneumatically conveyed stalk pieces and the latter are compressed to form an upwardly moving compact plug or bed fed by a worm from below in a shaft furnace and which is subjected at a lower part of the plug to thermal carbonization or decomposition which can be flameless and results in volatilization of gasifiable components of the stalks to produce distillation gases.

According to the invention, fresh air is fed to the distillation gases within the rising plug or bed and the distillation gases are burned in the region of the free upper surfaces of the compact stalk bed, the resulting exhaust gases entraining ash formed in the process away from this bed and thereby constantly renewing the surface exposed to combustion.

According to the invention, moreover, the ash is separated from the resulting hot gases and the latter, primarily hot air, are used for crop-drying process, especially for the drying of kernels of corn, wheat or other grains.

The process of the present invention has the important advantage that it can be carried out continuously, thereby eliminating the need to compress the stalks into large units which must be individually handled for charging into the combustion chamber. Furthermore, since the ash is continuously removed, the combustion front continuously is renewed and the hot air, which becomes available after separation of the ash therefrom, can be continuously produced, thereby increasing the efficiency of a drying plant utilizing this hot air.

The combustion process, although continuous, has two stages which allow closer approximation to the conditions required for the complete combustion which is desirable. The discharge into the environment is minimal, if any, and the gas produced after separation of the ash can be released into the atmosphere, if desired, without any pollution effect. The combustion is practically smokeless.

The system of the present invention also allows the straw storage to be relatively remote from the combustion chamber without difficulty since the combustion chamber is supplied with relatively short stalk pieces readily transported by air through a simple pneumatic conveyor, namely, a duct. Fire danger at the storage site is avoided and hence one of the major problems of bale combustion is eliminated, namely the need to store large numbers of bales in the region of the combustion chamber which may be exposed to the danger of fire.

According to another feature of the invention, the ash after separation from the hot air is collected and dispersed in water so that, when the water has a predetermined ash concentration, the mixture can be utilized for fertilizer purposes, e.g. by direct distribution onto fields with a spreader, by spraying onto fields or by introduction into animal waste collectors or basins for upgrading liquid fertilizer made from animal wastes. The liquid components of the latter can be also spread onto the fields and the solids distributed thereon as well.

According to apparatus aspects of this invention, the combustion chamber is formed by a shaft furnace upstream of which is provided a separator drum in the form of perforated-wall structure, i.e. a sieve drum, into which the pneumatic conveyor delivers the air-entrained stalks. The air is discharged through the wall of the sieve drum and the stalks collected therein are compacted by a discharge worm and are fed through the feed channel in a compact state into the shaft furnace in the region of the bottom thereof at which the combustion front is maintained and below which low temperature distillation is effected.

According to a feature of the invention, the shaft furnace is provided with a hood which directs the hot gases and entrained ash into an ash separator, especially a cyclone, in which the solids are removed from the hot air which is discharged through a suction duct from the cyclone.

It has been found to be advantageous to provide the upright shaft furnace with an air-distribution lance connected to a fresh-air blower and reaching downwardly into the furnace while being provided at its lower end with its nozzle head disposed above the combustion front of the packed stalk bed.

This nozzle head has a multiplicity of discharge orifices or nozzles directed downwardly and outwardly to create a divergent pattern of air distribution trained upon the combustion surface of the bed.

Furthermore, the lance may be formed along its length with axially and circumferentially spaced orifices above the nozzle head. Primary air supply is only applied to the free upper surface of the compacted bed of the stalks so that stalks below this surface only undergo thermal decomposition without free flame combustion with the distillation gases rising to the surface.

The orifices above the head ensure full combustion of residual distillation gases and thus provide secondary air.

While the orifices of the nozzle head are inclined at angles different from 90° to the axis of the lance, the nozzles above the head are directed transversely to the axis of the lance and thereby impart a swirl to the distillation gases, and the entrained ash and any particles of combustible materials which may be entrained in the gas. The swirl centrifugally casts solids against the wall of the combustion chamber where the particles are intercepted and fall again to the combustion bed. The result is an excellent combustion similar to that which prevails in oil or gas-fired burners with swirl-inducing means, as well as an initial separation of particles from the gas.

According to another feature of the invention, the pneumatic conveyor extends in one or more turns around the shell of the ash separator so that a heat exchange between the hot combustion gases and the conveying air is effected during the conveying process. The heat of this conveying air serves to dry the stalks and preheat them. This has been found to be especially effective for smokeless combustion.

I have found also that the provision of a rotary sieve drum in the ash-separating cyclone is a special advantage in removing particulates from the discharged gas, the axis of this sieve drum extending parallel to the longitudinal axis of the cyclone. An axial end of this drum opens into the suction duct and means can be provided for conveying collected ash from the cyclone into a water basin. Since the ash is continuously removed, the system of the present invention represents a vast improvement over conventional straw-burning systems which must be shut down for ash removal after seven to eight hours of operation.

According to yet another feature of the invention, the sieve drum of the ash separator is provided with a shaft which also is connected to the discharge conveyor carrying the ash into the water basin. The bottom of this shaft can be provided with a stirrer which reaches into the water basin.

The conveying air which is heated by the thermal energy abstracted from the ash separator can also be utilized effectively after separation of the stalk pieces therefrom when, in accordance with a feature of the invention, the separator, hood, shaft furnace and the ash removal cyclone are provided in a common housing and an opening is formed in the cyclone in the region of the hood so that the hood can define a gap with an outer member through which air can be drawn from the vertical space surrounding the shaft furnace and delivered to the cyclone together with hot air from the shaft furnace.

Thus the air released at the stalk separator flows along the shaft furnace to cool the latter and to be further heated. This air has a heat content which is combined with that of the hot cleaned gases for use in crop drying in the manner described.

The entire assembly can be surrounded by a structure into which the discharge duct for the hot gas opens freely and substantially coaxially with the suction duct which is connected to the sieve drum of the cyclone. The cross section of the discharge duct at its open end is preferably greater than the cross seciton of the suction duct so that most of the heat generated in the apparatus can be drawn off together with the gases generated in the furnace. Naturally, the efficiency of the apparatus can be improved by thermally insulating this structure. The duct leading from the structure can be formed with a suction blower.

According to another aspect of the invention, the stalks are cut up and blown through the pneumatic conveyor in an apparatus having a cutter shaft with rotary cutter blades which are axially spaced by the desired distance of the stalk pieces.

According to the invention, the stalks are delivered in generally cyclindrical bales of straw and are fed by a conveyor to the blade shaft where each bale is supported on a pair of rolls whose axes are parallel to the blade shaft. The spacing of the blades on the shaft is adjustable so that stalk pieces of different lengths can be formed as desired.

This arrangement permits the bale storage to be remote from the furnace and prevents fire damage to the storage facility because the chopping of the stalks and the pneumatic displacement thereof enables a considerable distance to be provided without problems between the stalk separator and the cutter shaft.

Below the blade shaft there is provided a collecting hopper with a transverse conveyor, e.g. another worm, which carries the stalk pieces to the conveyor to which an air blower is connected.

The bales are preferably fed to the cutter shaft in a two-level arrangement, the upper level having a flight conveyor advancing the bales to the end of this conveyor from which the bales roll over a curved guide wall onto the lower level below the flight conveyor and to the cutter shaft which can be disposed beneath the flight conveyor.

The cutting station can have a flap or support-roll-operated switch for turning on and off the flight conveyor.

BRIEF DESCRIPTION OF THE DRAWING

The above and other objects, features and advantages of the present invention will become more readily apparent from the following description, reference being made to the accompanying drawing in which:

FIG. 4 is a plan view of the cutting apparatus of FIG. 3; and

FIG. 5 is a detail view corresponding generally to FIG. 3 but illustrating a modified embodiment of the cutting arrangement.

SPECIFIC DESCRIPTION

Figure 1:
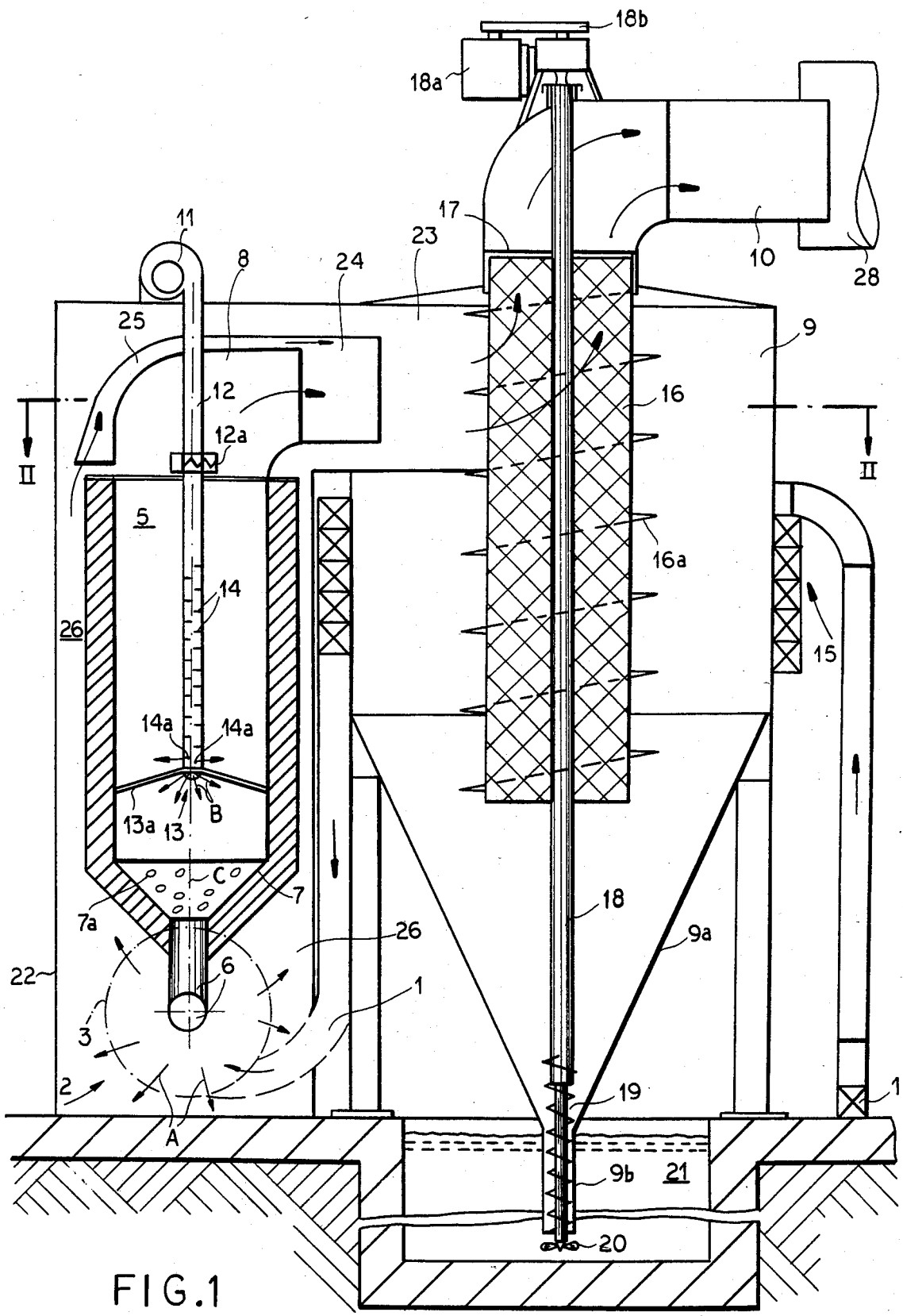
FIG. 1 is a vertical longitudinal cross section through a stalk-burning apparatus in accordance with the present invention, the section corresponding to a cross section taken along the line I—I of FIG. 2.
Figure 2:
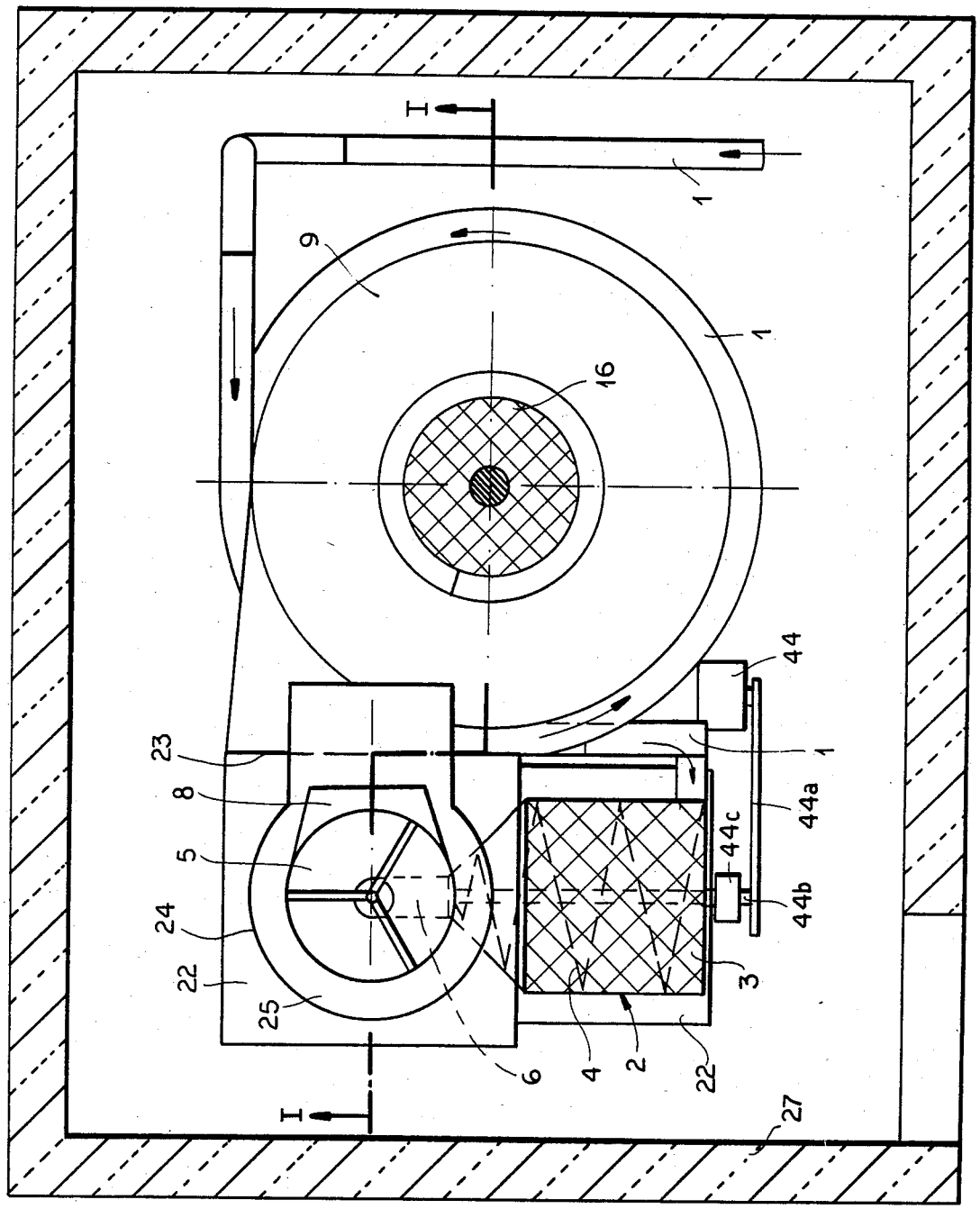
FIG. 2 is a cross section, also in diagrammatic form, corresponding to a view along section line II—II of FIG. 1.
Figure 3:
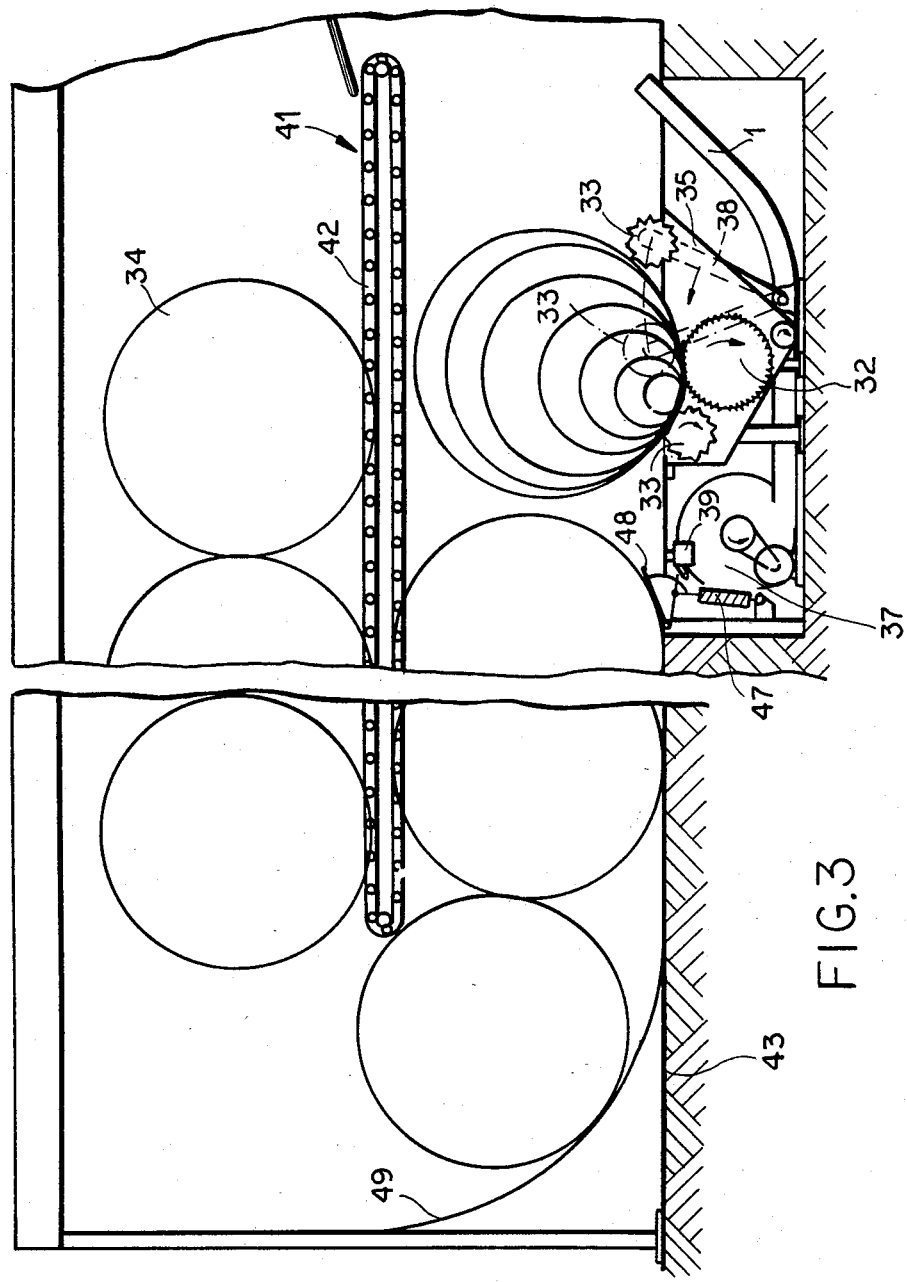
FIG. 3 is a diagram schematically illustrating in side view a cutter for baled long stalks especially straw bales to form the pieces of stalk for working in the apparatus in FIGS. 1 and 2.

In FIGS. 1 and 2 of the drawing, I have shown an incinerator which cooperates with the cutting arrangements of FIG. 3 (and 4) or 5 such that a stalk feed passage 1, for the stalk pieces from the cutting arrangement (e.g. of FIG. 3) opens into a separator 2 (FIG. 1) formed as a sieve drum in which separation of straw stalks from air is effected. The duct 1 thus represents a pneumatic conveyor for the straw stalks.

The straw stalks collect within the perforated drum portion 3 of the separator with air flowing outwardly as represented by the arrows A in FIG. 1.

Within the drum 3 there is provided a discharge worm 4 (seen diagrammatically in FIG. 2) which is driven by a motor 44 via a belt 44a rotating the shaft 44b of the worm which is supported in a bearing 44c.

The discharge worm 4 advances the stalks through a feed channel 6 which opens into a shaft furnace 5.

The feed channel 6 is so constructed that the stalks are compacted together in this passage and move as a rising plug or compact body into the shaft furnace 5, advanced by the worm 4.

The feed channel 6 opens into bottom 7 of the shaft furnace in a substantially vertical manner although it can also open horizontally into the shaft furnace according to the present invention.

At its upper end, the shaft furnace 5 communicates with a hood 8 which opens into an ash separator 9 of the cyclonic type and in which the exhaust gas from the shaft furnace 5, with entrained solids, especially ash, is treated to remove the solids from the gas.

The cyclonic separator 9 is formed centrally with a suction duct 10 which can be connected to a fan (not shown).

The air supply to the shaft furnace is provided by a fresh air blower 11 whose discharge end communicates with a lance 12 extending axially and centrally down below into the shaft furnace, terminating above the bottom thereof within the rising plug or bed and provided with lateral perforations and a nozzle head 13 as will be described below.

The end of the lance 12, spaced from the bottom 7 of the shaft furnace is thus formed with a nozzle head 13 whose nozzles or outlets are inclined to the longitudinal axis of the lance. The angles differ from 90° and differ from one another, i.e. the nozzle orifices have axes directed along arrows B which include angles with the axis C of the lance and are turned downwardly; a divergent bundle of jets of air is thus discharged downwardly, the bundle having a configuration of a sprinkler discharge or spray spreading over the entire cross section of the shaft furnace.

The rising bed of the combustible stalks, preheated as will be described, is subjected to low temperature carbonization and destructive distillation below its exposed upper surfaces with the distillation zone extending up from the mouth of the feed channel 6 opening into the bottom 7 of the shaft furnace.

Above the head 13 the lance 12 is formed with lateral openings 14, 14a by which air is fed into the upper portion of the furnace above the packed bed. Flame combustion of the distillation gas and the uppermost stalks of the bed occurs at the exposed surface of the latter.

The openings or orifices 14 proximal to the head 13 form an angle with the longitudinal axis of the shaft furnace to assure effective swirl of the air and the solids which are entrained by these high velocity jets from the fuel bed and are transversely cast against the shaft furnace walls from which they in part cascade back to the bed.

The stalk—feed conveyor 1 extends around the cylindrical shell of the cyclone 9 used for ash separation in one or more turns 15 as a tube coil.

In a steady operation, heat from the ash separator 9 is transferred to the coil 15 to raise the air temperature of the conveying air stream traversing same, thereby heating the stalks and drying them. Within the ash-separating cyclone 9, a sieve drum 16 is rotatably mounted and is driven, the axis of this drum coinciding with the axis of the cyclone 9, In other words the sieve drum 16 and the cyclone 9 are coaxial.

The upper end 17 of the sieve drum 16 is received in suction duct 10 so that particle-free gases are drawn from the cyclone through the drum 16.

The drum 16 is formed externally with a worm 16a carrying any ash which collects upon the sieve drum downwardly to the downwardly converging funnel-shaped bottom 9a of the sieve drum 16.

The funnel-shaped part 9a terminates in a cylindrical duct 9b in which a further discharge worm 19 is mounted to force the ash out of the cyclone 9 and into a water basin 21.

The shaft 18 of this sieve drum, which is driven by a motor 18a via a belt system 18b is formed at its lower end with a worm 19 and with a stirrer 20, the latter extending below the liquid level in the water basin 21.

As soon as the water in basin 21 is sufficiently saturated with ash it can be discharged into an animal-waste vessel for combination with liquid and solid animal wastes as a means of upgrading this product before it is discharged onto fields as fertilizer. The liquid component is preferably sprayed onto the field.

The apparatus also comprises a housing 22 for the shaft furnace 5, the separator 2 and the hood 8.

This housing is formed, in the region of the hood 8, with an opening 23 into the ash separator 9. This permits the warm transport air separated from the stalks 12 to be combined, after heating, in the housing 22 around the furnace within the housing, with the hot gases which ultimately traverse the ash separator 9. Part of the heat of this air is therefore recovered by transfer to the tube 15.

To utilize the heat generated by the combustion in the shaft furnace most effectively, the hood 8 is spacedly surrounded by an outer hood 24 which defines a gap 25 with hood 8, the gap 25 communicating with the space 26 within the housing 22 extending vertically along the exterior of the shaft furnace 5. This outer hood 24 thus also opens into the interior of the ash separator 9.

As is especially clear from FIG. 2, the shaft furnace 5, the first separator 2, the head 8 and the ash separator 9 with its suction duct 10 are surrounded by further housing or structure 27 which has not been shown in FIG. 1.

The outlet duct 28 for the hot gases which can open freely into the housing 27 has been shown schematically in FIG. 1. This duct 28 opens substantially coaxially with the suction duct 10 and has a cross section at its opening which is greater than the cross section of duct 10 carrying the hot gases withdrawn from the separator 9.

Thus duct 28 discharges both these hot gases and also the hot air within the structure 27 and enables the hot air and gas to be used further processes, preferably for crop treatment, e.g. the drying of grains such as the drying of corn kernels.

FIGS. 3 and 4 show a cutting arrangement for straw designed to produce the small pieces thereof which are pneumatically transported to the separator in FIG. 1, then packed, subjected to low temperature carbonization and distillation and ultimately to combustion in the shaft furnace 5.

This cutting arrangement comprises a shaft 31 upon which are mounted circular blades 32 which may have smooth, serrated or toothed peripheries, e.g. circular saw blades. The axial spacing of the blades 32 is adjustable to correspond to the length of the stalk pieces adapted to be pneumatically conveyed to the apparatus of FIGS. 1 and 2.

The stalks are initially pressed into generally cylindrical straw bales 34 and are then fed to the blade shaft 31 where they rest upon supporting rolls 33 whose axes are parallel to the blade shaft.

Beneath the blade shaft 31, there is provided a collecting hopper 35 for the stalk pieces and in the region of the bottom of collector 35 a transverse conveyor 36 is provided.

The transverse conveyor 36, which also can be of the worm type, feeds the stalk pieces into the channel 1, which is provided with an air blower 37 for pneumatically displacing these pieces in the manner described.

Starting and stopping of the conveyor 41 for advancing the bales 34 can be effected automatically as each bale is cut up into the stalk pieces.

At this end, one of the support rolls 33 can be journaled on a swingable arm 38 biased by a spring 46 (see FIG. 5) which holds the roll 33 against the bale as the bales become smaller with cutting as represented by the successively smaller circles at the bottom of FIG. 3. The support roll thus follows the periphery of the bale and eventually results in displacement of the pivotal arm into its dot-dash position. This movement can be used to turn on the conveyor 41.

In the path of the pivotal arm 38 a sensitive start switch 40 for the conveyor 41 of bale 34 is provided. In the dot-dash position shown in FIG. 5, the arm 38 has engaged the switch 40 so that a new bale is fed to the cutter and swings the arm 38 into the solid line position shown against the force of spring 46. In this position the arm can operate a stop switch.

The cut-off of the conveyor 41 can also be effected by a flap 48 (see FIGS. 3 through 5) biased into an upper position by a spring 47 and thereby projecting above the support plane 43 for the bales. As each bale 34 is advanced by the conveyor 31 to the cutter arrangement, it ultimately passes over the flap 48 to deflect it downwardly and thereby trip the stop switch 49 for the conveyor 41. The latter can be a flight conveyor in which the movable bars or flights draw the bales over a fixed surface.

The conveyor 42 thus carries the straw bales 34 along its surface, e.g. from the baling machine on the right to the discharge edge at the left, the bales then passing from this upper level via a curved deflecting wall 49 to the lower stage of the feeder and ultimately to the cutting device.

It will be apparent that this two-level arrangement is highly compact.

A portion of the bottom 7 of the shaft furnace 5 is perforated as shown at 7a to permit part of the distillation gases to be removed for combustion externally of the shaft furnace, e.g. in an internal combustion engine to provide power for driving the various motors and blowers of the system shown of course for other purposes.

The lance 12 (see FIG. 1) may be rotatable as represented by the bearing 12a between the head 13 and the upper portion, rotation of the bottom portion being permitted by a support spider 13a. Thus the arms of the spider, which can rotate with the shaft 12, form scrapers along the walls of the shaft furnace to prevent packing of the solids which may collect along these walls, thereby increasing the efficiency of the apparatus.

I claim:

1. A method of incinerating stalks of a crop material, comprising the steps of:
   (a) cutting said stalks of crop material into relatively short pneumatically conveyable pieces;
   (b) pneumatically conveying said pieces in an air stream to an incineration station while heating the pneumatically conveyed pieces by causing them to pass in indirect heat exchange with hot combustion gas;
   (c) separating the air of said stream from said pieces at said station by trapping the pneumatically conveyed pieces in a screen drum;
   (d) compacting the pieces separated from air in said screen drum and feeding said pieces in a compacted body by a worm through a pipe upwardly into an upright combustion chamber so that said compacted body forms a rising plug of said pieces in said combustion chamber so as to sustain a destructive distillation of said pieces below an exposed surface of said body in said chamber to produce a combustible gas;
   (e) feeding fresh air to said chamber from a lance reaching downwardly toward said plug to sustain combustion of said combustible gas and burn said pieces at said surface of said body, thereby forming ash at said surface;
   (f) entraining ash upwardly from said surface in a hot gas stream formed by burning said pieces at said surface; and
   (g) separating ash from said hot gas stream whereby said hot gas stream can be used for the drying of an agricultural product.

2. The method defined in claim 1, further comprising the step of collecting ash separated from said hot gas stream in water and dispersing water containing ash as at least a fertilizer component upon a field.

3. The method defined in claim 1 wherein air stream conveying said pieces in step (b) is heated by heat exchange with said hot gas stream during step (g).

4. The method defined in claim 3 wherein:
   said ash is separated from said hot gas stream in step (g) by a cyclone, and
   the air stream pneumatically conveying said pieces in step (b) is passed in a plurality of turns around said cyclone in heat-exchanging relation with a roll of said cyclone.

5. The method defined in claim 4 wherein:
   said pipe feeds said plug upwardly into an upwardly converging frustoconical bottom of a shaft furnace forming said combustion chamber, further comprising the step of withdrawing combustible gas generated by said destructive distillation through an aperture in said bottom for combustion outside of said chamber.

6. The method defined in claim 5, further comprising the step of entraining burning pieces from said surface in air jets from said lance against a wall of said furnace from which the pieces cascade onto said body.

7. The method defined in claim 6, further comprising the step of collecting ash separated from said hot gas stream in said cyclone on a rotary screen drum and removing the thus-collected ash from said drum.

* * * * *